(12) United States Patent
Hession et al.

(10) Patent No.: US 8,849,907 B1
(45) Date of Patent: Sep. 30, 2014

(54) SYSTEM AND METHOD FOR NOTIFYING PARTICIPANTS OF TOPICS IN AN ONGOING MEETING OR CONFERENCE

(75) Inventors: Patrick Hession, Mervue (IE); Tony McCormack, Mervue (IE); John Costello, Mervue (IE)

(73) Assignee: Rockstar Consortium US LP, Plano, TX (US)

( * ) Notice: Subject to any disclaimer, the term of this patent is extended or adjusted under 35 U.S.C. 154(b) by 713 days.

(21) Appl. No.: 11/395,601

(22) Filed: Mar. 31, 2006

(51) Int. Cl.
*G06F 15/16* (2006.01)
*H04L 12/18* (2006.01)
*H04L 29/06* (2006.01)
*H04L 12/58* (2006.01)

(52) U.S. Cl.
CPC ............ *G06F 15/16* (2013.01); *H04L 12/1831* (2013.01); *H04M 2203/352* (2013.01); *H04M 2203/5009* (2013.01); *H04L 29/06401* (2013.01); *H04L 12/1822* (2013.01); *H04L 12/581* (2013.01)
USPC ........................................................ 709/204

(58) Field of Classification Search
CPC ................ G06F 15/16; H04L 12/1813; H04L 29/06401; H04L 65/4015; H04L 12/1881; H04L 12/1822; H04M 3/56
USPC .................................. 709/206, 207, 227, 204
See application file for complete search history.

(56) References Cited

U.S. PATENT DOCUMENTS

| | | | | |
|---|---|---|---|---|
| 736,349 A * | 8/1903 | Bell | ................................. | 215/6 |
| 4,540,850 A * | 9/1985 | Herr et al. | .................. | 379/88.19 |
| 4,635,251 A * | 1/1987 | Stanley et al. | ................ | 370/261 |
| 4,710,917 A * | 12/1987 | Tompkins et al. | ............ | 709/204 |
| 4,850,011 A * | 7/1989 | Delmege et al. | ............... | 379/157 |
| 5,195,086 A * | 3/1993 | Baumgartner et al. | ....... | 370/264 |
| 5,206,934 A * | 4/1993 | Naef, III | ........................ | 709/204 |
| 5,341,374 A * | 8/1994 | Lewen et al. | ................. | 370/450 |
| 5,408,526 A * | 4/1995 | McFarland et al. | ...... | 379/202.01 |
| 5,664,126 A * | 9/1997 | Hirakawa et al. | .............. | 715/751 |
| 5,878,219 A * | 3/1999 | Vance et al. | .................. | 709/217 |
| 5,907,324 A * | 5/1999 | Larson et al. | ................. | 715/753 |
| 5,909,543 A * | 6/1999 | Tanaka et al. | ................. | 709/204 |
| 6,167,432 A * | 12/2000 | Jiang | ............................. | 709/204 |
| 6,173,314 B1 * | 1/2001 | Kurashima et al. | ........... | 709/204 |
| 6,181,736 B1 * | 1/2001 | McLaughlin et al. | ........ | 375/222 |
| 6,201,859 B1 * | 3/2001 | Memhard et al. | .......... | 379/93.21 |
| 6,275,575 B1 * | 8/2001 | Wu | .......................... | 379/202.01 |
| 6,542,748 B2 * | 4/2003 | Hendrey et al. | ............. | 455/456.1 |
| 6,573,926 B1 * | 6/2003 | Ichimura | .................... | 348/14.08 |
| 6,597,378 B1 * | 7/2003 | Shiraishi et al. | ............. | 715/764 |
| 6,813,714 B1 * | 11/2004 | Hardjono et al. | ............... | 726/14 |
| 6,970,547 B2 * | 11/2005 | Andrews et al. | ......... | 379/210.01 |
| 6,976,220 B1 * | 12/2005 | Lapstun et al. | ............... | 715/753 |

(Continued)

OTHER PUBLICATIONS

Katrinis et al., "Dynamic Adaptation of Source Specific Distribution Trees for Multiparty Teleconferencing", 2005.*

(Continued)

*Primary Examiner* — O. C. Vostal
(74) *Attorney, Agent, or Firm* — Christopher & Weisberg, P.A.

(57) ABSTRACT

A conference notification system in which potential participants to a conference re notified of relevant sections of the conference as they occur. Records are maintained of associations of persons to at least one or more conference section indicators, each indicator being uniquely associated with a conference section. The system identifies the current conference section and identifies persons associated with the current section, notifying them accordingly.

33 Claims, 4 Drawing Sheets

(56) References Cited

U.S. PATENT DOCUMENTS

| | | | |
|---|---|---|---|
| 7,007,235 B1* | 2/2006 | Hussein et al. | 715/751 |
| 7,119,828 B1* | 10/2006 | Kizhnerman et al. | 348/14.08 |
| 7,240,094 B2* | 7/2007 | Hackney et al. | 709/205 |
| 7,308,090 B2* | 12/2007 | White et al. | 379/202.01 |
| 7,330,541 B1 | 2/2008 | Surazski et al. | 379/202.01 |
| 7,358,985 B2* | 4/2008 | Uchihashi et al. | 348/14.08 |
| 7,395,508 B2* | 7/2008 | Hintermeister et al. | 715/751 |
| 7,412,392 B1* | 8/2008 | Satapathy | 704/270.1 |
| 7,467,185 B2* | 12/2008 | Lapstun et al. | 709/204 |
| 7,487,211 B2* | 2/2009 | Beavers et al. | 709/205 |
| 7,567,662 B1* | 7/2009 | Renner et al. | 379/202.01 |
| 7,570,752 B2* | 8/2009 | Jachner | 379/202.01 |
| 7,596,755 B2* | 9/2009 | Graham | 715/723 |
| 7,688,961 B2* | 3/2010 | Vicory et al. | 379/202.01 |
| 7,852,998 B1* | 12/2010 | Smith et al. | 379/202.01 |
| 8,020,104 B2* | 9/2011 | Robarts et al. | 715/744 |
| 8,467,308 B2* | 6/2013 | Johnston | 370/252 |
| 2002/0065928 A1* | 5/2002 | Senga et al. | 709/231 |
| 2003/0014488 A1* | 1/2003 | Dalal et al. | 709/204 |
| 2003/0065955 A1* | 4/2003 | Kumhyr et al. | 713/202 |
| 2003/0105817 A1* | 6/2003 | Lapstun et al. | 709/204 |
| 2003/0105820 A1* | 6/2003 | Haims et al. | 709/205 |
| 2003/0208536 A9* | 11/2003 | Lee et al. | 709/204 |
| 2003/0217099 A1* | 11/2003 | Bobde et al. | 709/202 |
| 2004/0003040 A1* | 1/2004 | Beavers et al. | 709/204 |
| 2004/0047461 A1* | 3/2004 | Weisman et al. | 379/202.01 |
| 2004/0105395 A1* | 6/2004 | Friedrich et al. | 370/261 |
| 2004/0170267 A1* | 9/2004 | Seligmann | 379/211.01 |
| 2004/0174972 A1* | 9/2004 | Amano et al. | 379/202.01 |
| 2005/0014490 A1* | 1/2005 | Desai et al. | 455/416 |
| 2005/0056692 A1* | 3/2005 | Paul et al. | 235/375 |
| 2005/0197854 A1* | 9/2005 | Grosvenor | 705/1 |
| 2005/0206721 A1* | 9/2005 | Bushmitch et al. | 348/14.09 |
| 2005/0207357 A1* | 9/2005 | Koga | 370/260 |
| 2006/0031290 A1* | 2/2006 | Mannaru et al. | 709/204 |
| 2006/0047557 A1* | 3/2006 | Bieselin et al. | 705/9 |
| 2006/0053195 A1* | 3/2006 | Schneider et al. | 709/204 |
| 2006/0067250 A1* | 3/2006 | Boyer et al. | 370/260 |
| 2006/0245379 A1* | 11/2006 | Abuan et al. | 370/261 |
| 2007/0081644 A1* | 4/2007 | Jachner | 379/106.01 |
| 2007/0097886 A1* | 5/2007 | Schwagmann et al. | 370/260 |
| 2007/0150583 A1* | 6/2007 | Asthana et al. | 709/224 |
| 2007/0156811 A1* | 7/2007 | Jain et al. | 709/204 |
| 2008/0046286 A1* | 2/2008 | Halsted | 705/2 |
| 2009/0097633 A1* | 4/2009 | James et al. | 379/215.01 |

OTHER PUBLICATIONS

Baldis, "Effects of Spatial Audio on Communication During Desktop Conferencing", 1998.*

Santos et al., "A Service-Oriented Architecture for a Collaborative Engineering Environment in Petroleum Engineering", 2006.*

* cited by examiner

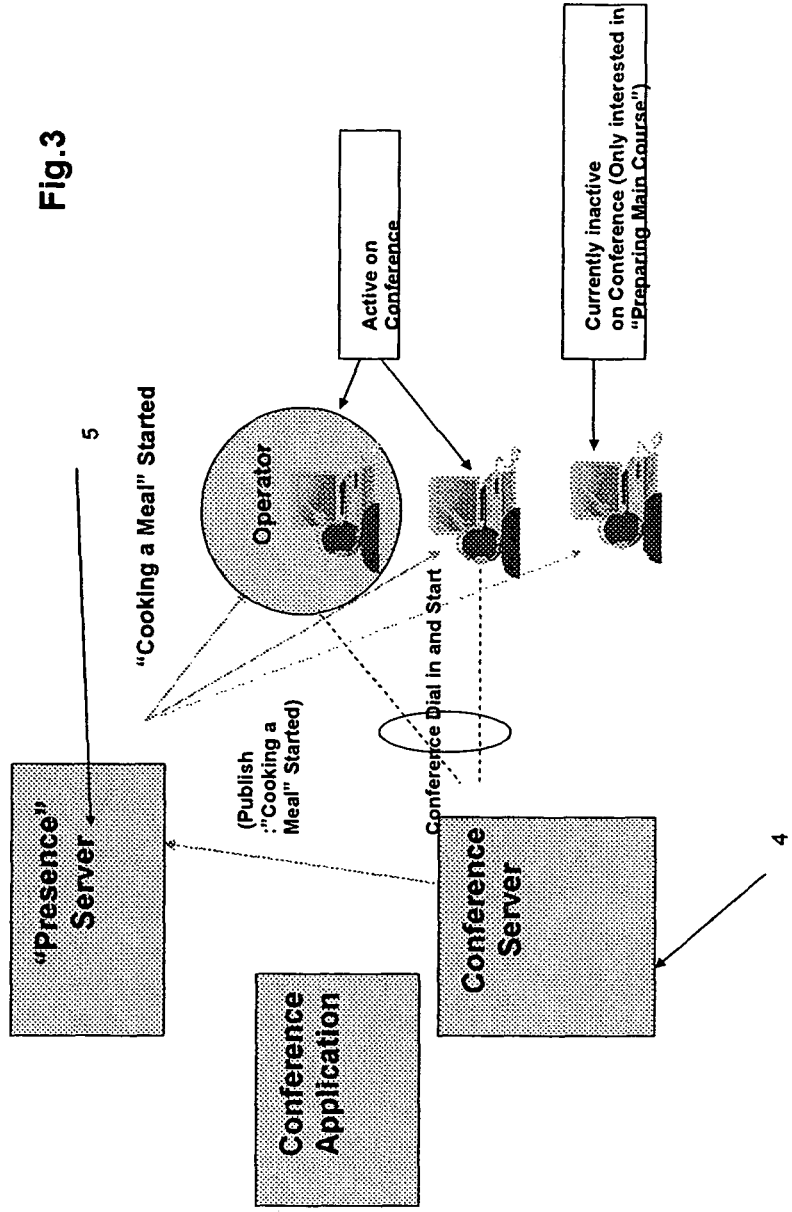

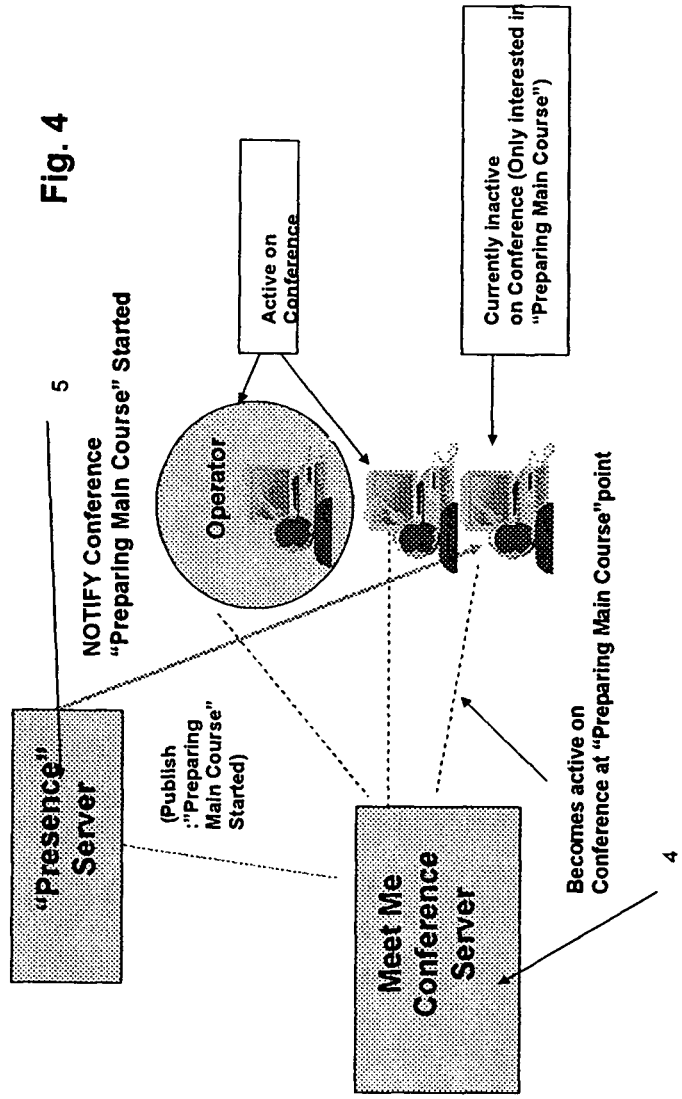

SYSTEM AND METHOD FOR NOTIFYING PARTICIPANTS OF TOPICS IN AN ONGOING MEETING OR CONFERENCE

This invention relates to a system and method for notifying potential participants of the current topic of a meeting or conference and automatically putting forward proposals concerning their participation when the current topic is particularly relevant to them or for which they have previously indicated an interest.

The invention relates primarily to video and teleconferences, but may also be utilised in face to face meetings where the participants are physically present. The invention relates mainly to the means and method of notification.

A high-level conference may extend over a number of different subjects and requires significant planning and management to ensure its success. Often such conferences require the participation of a large number of persons as active contributors or as passive observers.

Individual participants are frequently associated with a restricted part of the conference and are often not interested in the entirety of the conference, i.e. they are concerned by a limited number of points or topics in the agenda.

However, a problem arises for such participants if the schedule of the conference or meeting is not sufficiently detailed or if the conference schedule is not respected. It is an inefficient allocation of resources to have valuable personnel on standby during the entirety of the conference when their interest is limited to a restricted discussion which may only account for a fraction of the overall conference.

Amongst many advantages offered by the present invention, one advantage may be the elimination of these inefficiencies by defining a means and a method which allows participants to be enabled, controlled or otherwise restricted to participate in those sections of a conference which are of greatest concern or interest to them. It allows users to effectively opt out of those parts of a meeting which not relevant to them, by being notified when the sections of interest to them are taking place, thus saving on valuable resources.

It is a method and system which is content-aware, in that the invention links the current content of a discussion to potential current participants. It notifies participants selectively, according to their areas of interest.

SUMMARY OF THE INVENTION

In a first aspect of the invention a conference notification system is provided which comprises a means for maintaining records of associations of persons to at least one or more conference section indicators, each indicator being uniquely associated with a conference section, a means for identifying a current conference section, a means for outputting a current conference section indicator, a means for selecting from the maintenance means persons associated with the current conference section indicator; and a means for transmitting a notification.

In a second aspect of the invention each conference section indicator comprises at least one key word corresponding to a conference topic

SUMMARY OF THE FIGURES

FIG. 3 illustrates an exchange of information between interested parties after the commencement of the conference; and FIG. 4 illustrates the exchange of information between the system and interested parties at a point during the conference when a new agenda item is commencing.

DETAILED DESCRIPTION OF THE PREFERRED EMBODIMENT

The foregoing and further features of the present invention will be more readily understood from the following description of preferred embodiments, provided by way of example only and without limitation to the scope of the present invention as set out in the appended claims, with reference to the foregoing figures.

The first step in preparing a conference or meeting is the setting up of the conference by an organiser who proposes details (1) including subject, detailed agenda and invitee list. The details (1) are circulated to the invitees (2) via a suitable communication means, e.g. e-mail, instant messaging (IM), short messaging system (SMS) or the like, although it will be appreciated that other forms of electronic communication could also be employed.

Figure 1:
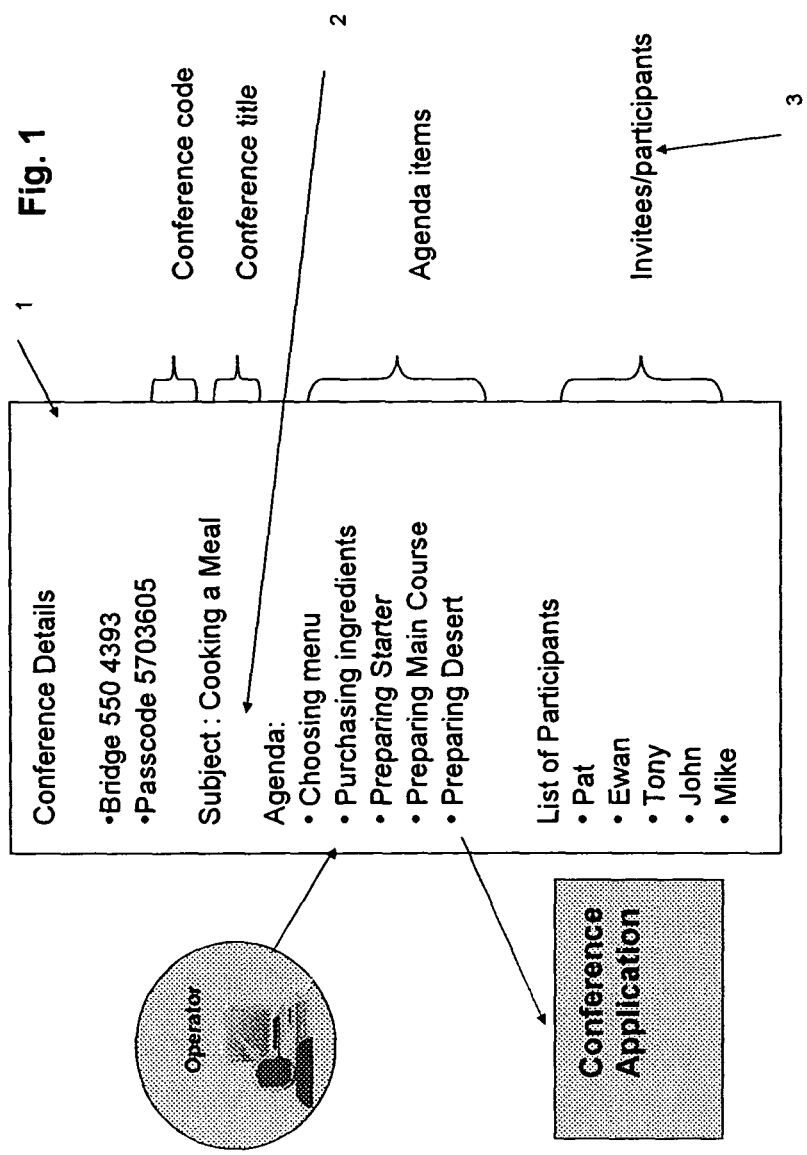
FIG. 1 illustrates an exemplary summary of conference details as received by a prospective participant.

In FIG. 1 the organiser, who may also be the chair person of the conference, submits details (1) of the conference to invitees. He may also delegate another person or a group of persons to carry out this task. The title (2) could be for example "Cooking a meal", with the conference schedule including a number of individual agenda items (3), e.g. "Choosing the menu", "Purchasing ingredients" etc.

Figure 2:
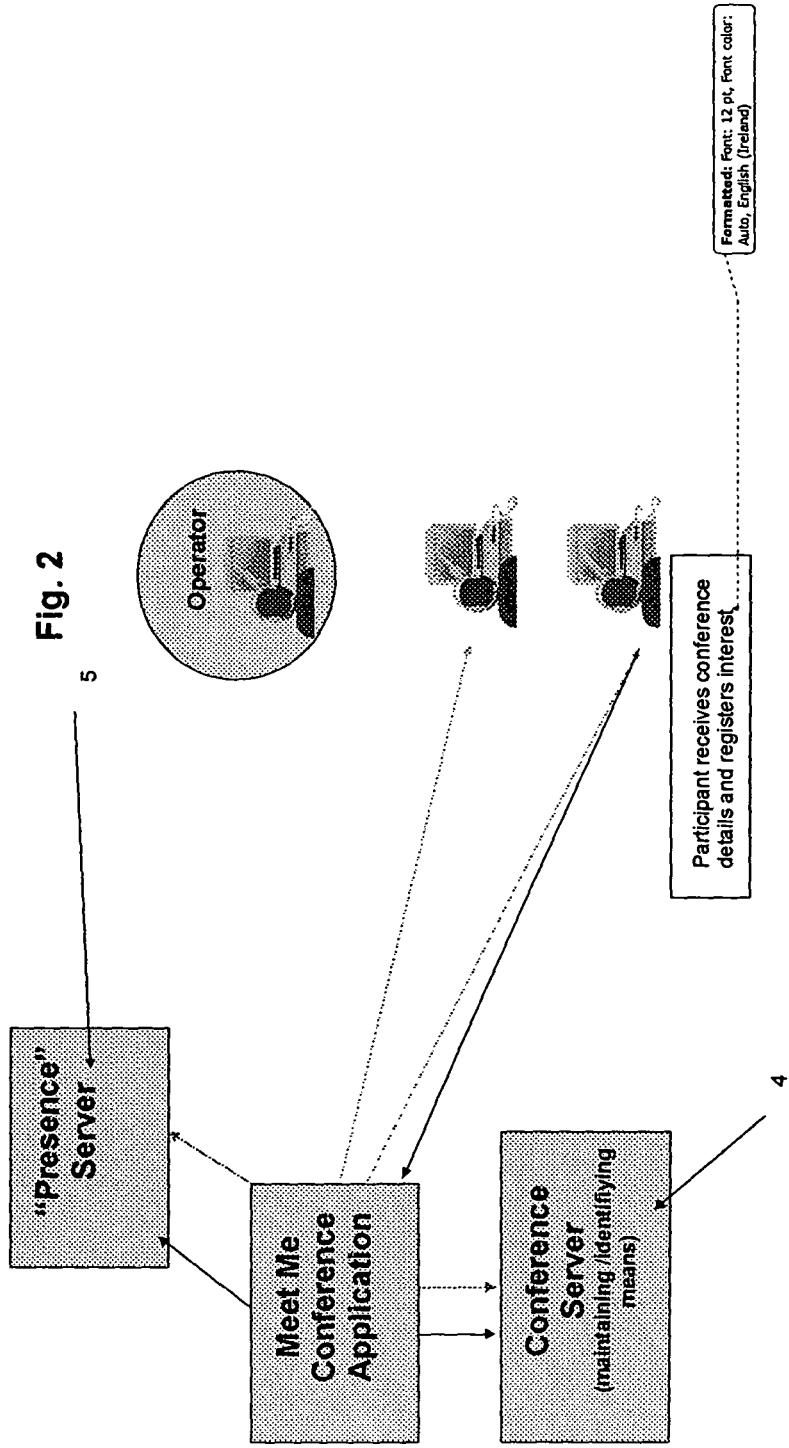
FIG. 2 illustrates the preliminary exchange of information within the system between organisers and participants of the conference prior to its commencement.

In FIG. 2 invitees receiving the conference invitation react to the receipt of the conference details by possibly the same communication means, although, once again, it will be appreciated that such invitees can utilise any suitable response means. Invitees to a conference or interested parties will register interest in the particular sections of the conference. Records of those persons indicating an interest in the conference will be entered in the system (4, 5) along with the sections of the conference which interests them. Preferably they will also input a number of ways they can be contacted: e-mail address, desk telephone number, mobile telephone number etc.

There is no obligation to register interest in all parts of the conference. An invitee can register for no items or select those that interest him/her. The system (4, 5) maintains the names of the persons concerned along with the conference sections of concern. The register (4) could be held on a database, but may also be any system where multiple data for a single record can be readily stored and accessed.

In each record the person's identity is maintained with an indicator of each conference section of interest to that person. The indicator could be an agenda item, a code, a title, a single key word or any combination of (key) words. In the same way as they registered their interest in the conference, the person can also update their records, change the sections that interest them, withdraw interest, etc. Similarly, the operator or authorised staff can also amend the records.

Invitees may also be sent an access code for the conference or a number of access codes for individual agenda items. This could be sent with the original invitation or upon registration, such that future participation requires the input of the appropriate access code.

At the commencement and during the conference the system is aware of the section of the conference currently underway. This is achieved by means of features described later. Once the system has identified which section is occurring, it calls up the corresponding section indicator as the current conference section indicator. It will select all persons associated with that particular conference section indicator. The current indicator is used in notifications to be sent to such users of the system, thereby informing those persons that the current section is, for example, item 1 or item 2 of the agenda, or "Choosing a Menu", "Purchasing Ingredients" etc. Where a person is identified as already being a current participant for a previous agenda item or section, then the system may be arranged to not send a notification to this participant. Alternatively, the system may be arranged to send the notification in order to ensure that such participant remains as a current participant for the newly identified conference section.

For the first agenda item the system will identify only those persons who have registered for "choosing a menu". These will be the currently active participants.

In FIG. 3, it can be seen that those who have not registered interest in the item/topic currently being discussed will not be selected. Thus those who have only registered interest in "Preparing the Main Course" will not be selected while earlier items are still in progress. Those participants registered for the current session will be in active communication with the conference, while those registered only for "Preparing the Main Course" will not be active.

As the agenda moves on notifications will be sent to the selected persons according to the current agenda item. Other persons become active as their items are started.

FIG. 4 illustrates the situation at a later time in the conference, when the agenda has reached the "Preparing the Main Course" topic. At this point the persons who have registered for this item will be selected by the system and a corresponding notification will be dispatched to each of them as necessary. Depending on their response they may elect to become active participants in the conference or they can remain offline.

This notification can be sent either directly to the persons or to the operator or the chair person of the conference. If sent to the person selected then they directly receive notification that the part of the conference for which they have registered an interest has just started. With the notification comes an invitation or query to the recipient asking him if he is going to join the conference. He can connect to the conference or remain disconnected, depending on his response. Further options may be available to him, such as requesting (without attending) a summary or notes of the discussion when the current item is concluded.

Alternatively, the system can be configured to submit the notification to the operator/chair person of the system. He receives the new conference section indicator, as described above, and he then takes the decision whether to submit the notifications to the individuals selected by the system. There may be good reasons for giving a prompt to the operator or chair person, and thereby retaining control over notifications close to the conference itself, such as overcrowding or unexpected developments in the conference proceedings. The prompt to the operator possibility gives him the means to block the notifications, such that the subsequent invitations are not transmitted. As in the case of direct submissions to the selected persons, notifications to the operator may offer him several response options: for example he may chose to invite certain suggested persons, but not others, perhaps electing to only send them a summary of the discussion.

The benefit of the invention is that until receiving notification that the conference has moved onto the item of interest, the participant can remain at his desk and is free to continue any other work. He is not interrupted until as and when his agenda item or items arise.

The system allows invitees themselves to register interest by entering themselves and entering the conference sections of interest, thereby creating a new record in the register. The system also allows changes to the records to be introduced by the persons registered or by a defined group e.g. the organising team, or an authorised department.

The notification carries the current conference section indicator, but it is received by the recipient in the form of a header or an audio announcement as a proxy for the indicator. For example, FIG. 3 indicates that a particular participant has registered for item 4 of the agenda, when the conference moves on this item, he will receive notification by either a header marked "Item 4" or "preparing the main course" or an audio recording such as "Session on preparing the main course now commencing". Preferably, additional information will be sent with the notification, such as location or room number, or main speaker, or expected duration, etc. As the recipient is already in a sense on standby, as he has "signed up" in the system, he will not be surprised by the notification. The detail which was hitherto unknown to him was the exact timing of the start of this agenda item.

The user may also sign up for a plurality of items on the agenda and thus can expect to be notified several times, once for each of the items he subscribes to, although some notifications may be negated if some of the user's selected items occur concurrently.

The concept underlying this invention is the recognition of the current agenda item by the system rather than by participants who may not wish to be present for the entirety of the discussion. The recognition can be achieved in a number of ways.

In one embodiment the system scans the discussion using voice recognition techniques to identify and analyse the words used by the current participants. The analysis allows the current topic and therefore the current conference section indicator to be identified. When the system discovers a new section indicator it initiates the process resulting in the transmission of notifications of the section indicator as discussed above.

Alternatively, the operator or the chair person himself will input the section indicator. Human input will allow the section indicators to be accurately updated and will not rely on the discussion including the appropriate words to be recognised in an automated system. For example, in FIG. 4 the chair person concludes item 3 on the agenda and announces to those present that the conference is moving on to item 4, which might be "Preparing the Main Course". The moment of change from one topic to another is unambiguous, being defined by the operator of the system. At that point he can input "Item 4" or "Preparing the Main Course" into the system, thus causing the system to call up those persons registered for Item 4. The system then continues in the manner indicated previously.

In a further embodiment of the invention users (operators, chairpersons, participants, observers, etc) of the system communicate and enter data using a graphical user interface GUI which is called up by the user or generated automatically upon receipt of a communications (including notification of particular conference sections). Thus the receipt of a notification by a registered person that his chosen conference section(s) has/have started, generates a GUI, for example a pop-up menu, at the recipient's communication device. In addition to the basic details of the communication, the menu may also contain a number of selectable options, as well as decline/accept queries. In this way the user can be guided through a routine when registering for a conference or in responses to notifications or other communications with the system. As noted above, the GUI may include a number of appropriate options such as, an invitee on receipt of an invitation may be prompted to respond to a decline/accept query regarding participation, he may be given the option of receiving a summary instead of attending, he may postpone a decision for a few minutes, etc. If access codes are needed, as described previously, the GUI may also prompt the user to input such codes as required. Typically, such options will appear to the user in the form of a drop-down or pop-up menu.

The system may further comprise a number of automatic "Meetme" conference facilities, whereby the functionality described above is automated in an interactive teleconferencing system. As before, the system stores records of invitees, acceptances and associated conference sections: the package of conference details and potential participants is stored as a "presence package", along with a conference "bridge number", uniquely identifying the conference and an access code allocated to individual participants allowing them to join the conference session, known as the conference bridge. On receipt of the presence package the user may select to be registered for the conference and is then required to enter all relevant information such as e-mail address, desktop and mobile telephone numbers, etc. The potential participant indicates to the server which parts of the conference are of interest to him: the system may allocate a single access code to access any part of the conference or a plurality of codes each corresponding to the particular section or particular sections which interest the participant.

In the automated Meetme version of the current invention the communication between the users is managed by a teleconference application server (4), which also stores all the relevant data by means of, for example, a database, and a server application module which comprises a processor for processing the communications, searching and retrieving data etc. Communications between server, operator consul, user terminals etc may be conducted through a dedicated data network, such as an enterprise data network and/or the internet and comprise e-mail, telephone, SMS. The communication network may be integral to the system or may be "brought in" for a specific event on a contractual or pay-as-you-go basis, i.e. provisioned by a service provider. Functionality may be increased if have Internet Protocol (IP) enabled telephony systems such as Session Initiation Protocol (SIP) desktop sets, IP enabled PCs or laptops and/or mobile cellular handsets connected. Access to the server may be achieved through a web page via an associated URL.

The automated system retains flexibility regarding any changes to the presence package, consequent upon re-issuing of communications or notifications, as well as changes to participant data.

In a further embodiment of the invention, also indicated in FIG. 4, the system is SIP-enabled. The system comprises a presence server and a plurality of SIP telephones or "presentities", which monitor, as a proxy for user presence, connection activity at the device, by means of a "presence user agent" (PUA). Presence information derived by each presentity can be transmitted directly to the presence server (5) and monitored by the watchers. The presence server maintains information on the presence of all users.

In operation, a system comprising a teleconferencing application server and SIP terminals, at least some of the user telephone terminals of the enterprise network would be registered by default with the presence server and the server's URL would be programmed into the PUAs. Whenever a terminal identifies a change in connection status, eg due to a user conversation, the PUA of that terminal sends to the presence server a message comprising the change. The message could take any suitable electronic form including email or SMS, but is preferably a packet data message of a format that is easily processed by the server, e.g. a SIP format message. In this way the presence server is informed of a SIP presence: it receives and maintains presence information on each user and uses it or transmits it, as appropriate, in accordance with the management of the system.

The system may comprise both a teleconferencing server and be SIP-enabled, whereby the system not only automatically manages the conference, storing and communicating conference packages and participant data and data on the current conference section, as described above—it also monitors presence information on each user. In this configuration the presence server and the teleconferencing server communicate, such that registration on the teleconferencing server automatically causes corresponding registration on the presence server and the processing of the conference can be carried out more selectively and more efficiently.

The system is enhanced in two ways: firstly, the presence server can communicate to the teleconferencing server the current presence information on each user and, secondly, the teleconferencing server can communicate to the presence server the registration information of each user.

The benefit of this exchange of information is, for example, that non-available subscribers are not sent notifications unnecessarily and the notification can be postponed until they become available. Alternatively the notification can be modified in some way, eg an e-mail or an SMS being sent instead of an audio message. The means of communication can be selected according to the presence information for the particular user. This version provides more focused information, allowing the system to be more selective in terms of notification recipients and reduces the resources required.

The invention also includes a computer program product comprising a computer readable medium for storing instruction code in order to implement the method described above.

The reader will appreciate that modifications and variations may be made within the scope of this invention.

We claim:

1. A system for notifying potential participants of a current conference section of a conference having a plurality of conference sections, each conference section corresponding to one of a plurality of conference topics, the system comprising:

a server configured to:
  maintain records of associations of persons to at least one conference section indicator, each indicator being uniquely associated with one of the plurality of conference sections and each indicator comprising one of an agenda item, a code, a title and at least one key word corresponding to one of the plurality of conference topics;
  identify during the conference the conference section of the plurality of conference sections which is currently underway;
  output a current conference section indicator uniquely associated with the current conference section;
  select from the maintained records one or more persons associated with the current conference section indicator to be registered conference participants;
  detect a presence status of each registered conference participant; and
  transmit a notification to a registered conference participant that a new current conference section has started, a mode of transmission of the notification depending on a presence status of the registered conference participant.

2. The system of claim 1, wherein the server is further configured to automatically transmit the notification when the new current conference section is identified.

3. The system of claim 1, wherein the server is further configured to transmit the notification to an operator of the system.

4. The system of claim 3, wherein the server is further configured to transmit the notification to the registered conference participants upon activation by the operator.

5. The system of claim 2, wherein the server is further configured to transmit the notification directly to the registered conference participants.

6. The system of claim 1, wherein the notification includes a header indicating the current conference section indicator.

7. The system of claim 1, wherein the notification includes an audio announcement indicating the current conference section indicator.

8. The system of claim 2, wherein the server is further configured to transmit a query to a selected person asking if the selected person would like to participate in the new current conference section as a registered conference participant.

9. The system of claim 8, wherein the server is configured to one of connect the selected person to and disconnect the selected person from the new current conference section in accordance with the selected person's response to the query.

10. The system of claim 9, wherein the registered conference participant is enabled to affect multiple entries to the new current conference section in accordance with a plurality of one of connections and disconnections based on the registered conference participant's responses to multiple queries.

11. The system of claim 1, wherein the server is further configured to employ speech recognition to identify the current conference section.

12. The system of claim 1, wherein the server is further configured to input the current conference section indicator, and to identify the input as the current conference section indicator.

13. The system of claim 1, wherein the server is further configured to maintain the records relating to the one or more persons and to the conference.

14. The system of claim 13, wherein the server further comprises a server application module which comprises a processor configured to search and retrieve data and control communications within the system and between the one or more persons and the system.

15. The system of claim 1, further comprising at least one SIP-enabled user terminal, comprising a presence user agent, configured to monitor connection activity at the terminal by the one or more persons, and a presence server configured to maintain the presence status of individual ones of the one or more persons, based on their monitored connection activity of the individual ones of the one or more persons.

16. The system of claim 15, wherein changes in presence status of individual ones of the one or more persons is automatically communicated to the presence server, which is updated accordingly.

17. A method in an interactive conferencing system for notifying potential participants of a current conference section of a conference having a plurality of conference sections, each conference section corresponding to one of a plurality of conference topics, the method comprising:

maintaining at a conference server records of associations of persons at least to one conference section indicator, each indicator being uniquely associated with one of the plurality of conference sections and each indicator comprising one of an agenda item, a code, a title and at least one key word corresponding to one of the plurality of conference topics;

identifying at the conference server during the conference the conference section of the plurality of conference sections which is currently underway;

selecting from the maintained records at the conference server at least one person associated with the current conference section indicator to be a registered conference participant; and transmitting a notification to a registered conference participant that a new current conference section has started, a mode of transmission of the notification depending on a presence status of the registered conference participant.

18. The method of claim 17, wherein transmitting a notification comprises automatically transmitting a notification when the new current conference section is identified.

19. The method of claim 17, wherein transmitting a notification comprises transmitting the notification to an operator of the system.

20. The method of claim 19, wherein transmitting the notification further comprises transmitting the notification to the registered conference participant when the operator authorizes such a transmission.

21. The method of claim 18, wherein transmitting a notification comprises transmitting the notification directly to the registered conference participant.

22. The method of claim 17, wherein the notification includes a header indicating the current conference section indicator.

23. The method of claim 17, wherein the notification includes an audio announcement indicating the current conference section indicator.

24. The method of claim 17, wherein transmitting a notification comprises transmitting a query to another selected person asking if the one other selected person would like to participate in the new current conference section.

25. The method of claim 24, further comprising one of connecting the one other selected person to and disconnecting the one other selected person from the new current conference section in accordance with the one other selected person's response to the query.

26. The method of claim 25, wherein the one other selected person effects multiple entries to the new current conference section in accordance with a plurality of connections or disconnections based on the one other selected person's responses to multiple queries.

27. The method of claim 17, wherein identifying comprises using speech recognition to identify the current conference section.

28. The method of claim 17, further comprising inputting the current conference section indicator, wherein the identifying includes identifying the input as the current conference section indicator.

29. The method of claim 17, wherein maintaining comprises maintaining the records relating to the persons and to the conference on a teleconferencing server.

30. The method of claim 29, wherein the teleconferencing server further comprises a server application module which comprises a processor configured to search and retrieve data and control communications within the system and between the persons and the system.

31. The method of claim 17, wherein said interactive conferencing system includes at least one SIP enabled user terminal comprising a presence user agent which monitors user connection activity at the terminal, and said conferencing system also includes a presence server which maintains the presence status of individual ones of the persons, based on their monitored connection activity.

32. The method of claim 31, wherein changes in presence status of individual ones of the persons are automatically communicated to the presence server, which is updated accordingly.

33. A computer program product comprising a non-transitory computer readable medium encoded with computer executable instructions for implementing a method in an interactive conferencing system for notifying potential participants of a current conference section of a conference having a plurality of conference sections, each conference section corresponding to one of a plurality of conference topics, the method comprising:

maintaining records of associations of persons at least to one conference section indicator, each indicator being uniquely associated with one of the plurality of conference sections and each indicator comprising one of an agenda item, a code, a title and at least one key word corresponding to one of the plurality of conference topics;

identifying during the conference the conference section of the plurality of conference sections which is currently underway;

selecting from the maintained records at least one person associated with the current conference section indicator to be a registered conference participant; and transmitting a notification to a registered conference participant that a new conference section has started, a mode of transmission of the notification depending on a presence status of the registered conference participant.

\* \* \* \* \*

UNITED STATES PATENT AND TRADEMARK OFFICE
CERTIFICATE OF CORRECTION

PATENT NO.         : 8,849,907 B1                                Page 1 of 1
APPLICATION NO.    : 11/395601
DATED              : September 30, 2014
INVENTOR(S)        : Patrick Hession et al.

It is certified that error appears in the above-identified patent and that said Letters Patent is hereby corrected as shown below:

On the Title page, column 2, item (57) under "Abstract", line 2, replace "re" with --are--.

Signed and Sealed this
Third Day of March, 2015

Michelle K. Lee
*Deputy Director of the United States Patent and Trademark Office*